United States Patent
Quick et al.

(10) Patent No.: US 8,321,431 B2
(45) Date of Patent: Nov. 27, 2012

(54) ITERATIVE AND INTERACTIVE CONTEXT BASED SEARCHING

(75) Inventors: William M. Quick, West Bountiful, UT (US); Darren Leroy Wesemann, North Salt Lake, UT (US); Brent C. Maxwell, West Valley, UT (US)

(73) Assignee: Frogzog, LLC, Centerville, UT (US)

( * ) Notice: Subject to any disclaimer, the term of this patent is extended or adjusted under 35 U.S.C. 154(b) by 211 days.

(21) Appl. No.: 12/548,689

(22) Filed: Aug. 27, 2009

(65) Prior Publication Data
US 2010/0057728 A1      Mar. 4, 2010

Related U.S. Application Data

(60) Provisional application No. 61/092,570, filed on Aug. 28, 2008.

(51) Int. Cl.
G06F 7/00      (2006.01)
G06F 17/30      (2006.01)

(52) U.S. Cl. ........................................ 707/754; 707/755
(58) Field of Classification Search ........................ None
See application file for complete search history.

(56) References Cited

U.S. PATENT DOCUMENTS

| | | | |
|---|---|---|---|
| 6,505,046 B1 * | 1/2003 | Baker | 455/456.3 |
| 6,736,322 B2 * | 5/2004 | Gobburu et al. | 235/462.46 |
| 6,772,150 B1 * | 8/2004 | Whitman et al. | 707/721 |
| 6,996,579 B2 | 2/2006 | Leung et al. | |
| 7,216,121 B2 * | 5/2007 | Bachman et al. | 1/1 |
| 7,284,008 B2 * | 10/2007 | Henkin et al. | 1/1 |
| 8,086,605 B2 * | 12/2011 | Xu et al. | 707/732 |
| 2003/0004802 A1 | 1/2003 | Callegari | |
| 2004/0128197 A1 | 7/2004 | Bam et al. | |
| 2005/0004840 A1 | 1/2005 | Wanninger | |
| 2006/0167753 A1 | 7/2006 | Teague et al. | |
| 2006/0180664 A1 | 8/2006 | Barrett et al. | |
| 2007/0087732 A1 | 4/2007 | Hsueh | |
| 2007/0150339 A1 | 6/2007 | Retter et al. | |
| 2007/0156677 A1 * | 7/2007 | Szabo | 707/5 |
| 2007/0162341 A1 | 7/2007 | McConnell et al. | |
| 2007/0208879 A1 | 9/2007 | Liu | |
| 2008/0027810 A1 | 1/2008 | Lerner et al. | |

* cited by examiner

*Primary Examiner* — Tony Mahmoudi
*Assistant Examiner* — Tuan A Pham
(74) *Attorney, Agent, or Firm* — Kenneth E. Horton; Kirton McConkie, PC (57) ABSTRACT

The present invention extends to methods, systems, and computer program products for iteratively and interactively searching for information. Embodiments of the invention can provide a user with relevant location-specific information in response to a query from the user. Provided information can also be relevant to a user's predicted future behavior. As context for a user is obtained and/or accumulated, such as, for example, through an interactive query dialogue, the probability of providing relevant information in response to a query from the user increases.

21 Claims, 5 Drawing Sheets

ITERATIVE AND INTERACTIVE CONTEXT BASED SEARCHING

CROSS-REFERENCE TO RELATED APPLICATIONS

The present application claims priority to U.S. Provisional Patent Application No. 61/092,570, filed Aug. 28, 2008, and titled "PREDICTIVE BEHAVIOR CONTEXT SEARCH METHOD AND SYSTEM, which is herein incorporated by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

One computing task that is often performed on a computer network is searching for information. For example, on the World Wide Web ("WWW"), a variety of search engines can be used to search for information. When a user desires to search for specific information, the user formulates search terms (possibly a search string) that describe and/or summarize the specific information. The search terms are entered through a Web browser and submitted to a search engine. The search engine compares the search terms to entries in a database (e.g., entries having been previously obtained from Web crawling) to attempt to identify matches between the search terms and entries in the database. Any matches are identified as "hits" and are returned back to the user.

Unfortunately, depending on the entered search terms, a manageable and relevant set of hits is often not returned back to the user. If the search terms are too broad, a large number of hits that are less relevant to the specific information can be returned. Further, even if some more relevant hits are included, there is no guarantee that the more relevant hits will be presented to the user prior to less relevant hits. On the other hand if the search terms are to narrow, too few hits can be returned. Additionally, the few hits that are returned may not include the specific information wanted by the user.

Further, most, if not all, search engines identify hits simply based on matching techniques (e.g., string comparisons). As such, search engines typically do not consider other information, such as, for example, the results of prior searches, user information, environmental information, etc., when identifying hits. This simplicity when identifying hits often results in returning at least some (and potentially a large number of) hits that are less relevant to the specific information desired by a user. As a result, a user is typically required to refine the scope of their search terms to both adjust the number of and potentially increase the relevancy of returned hits. However, depending on the desired specific information, it can be difficult to enter search terms that return an appropriate number of relevant hits such that the user is not overwhelmed but is still provided with the desired specific information.

BRIEF SUMMARY

The present invention extends to methods, systems, and computer program products for iterative and interactive context based searching. A search system receives a query from another computing device. The query includes search terms of a user request for information. The query is parsed to identify the included search terms and to identify the user.

Relevant contextual data for the user is accessed based on the search terms and the identity of the user. The relevant contextual data includes at least accumulated behavioral data for the user. The accumulated behavioral data is indicative of one or more prior interactions the user has had with the search system. In some embodiments, other contextual data is also received from external data sources (e.g., weather services, flight information services, sports scores services, etc.) A current context is formulated for the query from the relevant contextual data for the user (potentially combined with the other contextual data from the external data sources). It is determined that the search terms insufficiently define the user request for information in view of the current context.

The search system enters into an interactive query dialogue with the other computing device to obtain additional relevant contextual data for the user. The interactive query dialogue includes submitting a further query back to the other computing device. The further query requests the additional contextual data for the user. The interactive query dialogue also includes receiving the additional contextual data from the other computing device. The additional contextual data was entered by the user at the other computing device. The interactive query dialogue can include one or more exchanges wherein the search system submits a query and the other computing device returns additional contextual data in response to the query.

A refined context for the query is formulated from the current context and the additional contextual data. The search terms are used in view of the refined context to search the searchable information in the database for any relevant portions of data responsive to the query. One or more relevant portions of data responsive to the query are identified from the database. The one or more portions of data are returned to the other computing device in response to the query.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for iterative and interactive context based searching. A search system receives a query from another computing device. The query includes search terms of a user request for information. The query is parsed to identify the included search terms and to identify the user.

Relevant contextual data for the user is accessed based on the search terms and the identity of the user. The relevant contextual data includes at least accumulated behavioral data for the user. The accumulated behavioral data is indicative of one or more prior interactions the user has had with the search system. In some embodiments, other contextual data is also received from external data sources (e.g., weather services, flight information services, sports scores services, etc.) A current context is formulated for the query from the relevant contextual data for the user (potentially combined with the other contextual data from the external data sources). It is determined that the search terms insufficiently define the user request for information in view of the current context.

The search system enters into an interactive query dialogue with the other computing device to obtain additional relevant contextual data for the user. The interactive query dialogue includes submitting a further query back to the other computing device. The further query requests the additional contextual data for the user. The interactive query dialogue also includes receiving the additional contextual data from the other computing device. The additional contextual data was entered by the user at the other computing device. The interactive query dialogue can include one or more exchanges wherein the search system submits a query and the other computing device returns additional context information in response to the query.

A refined context for the query is formulated from the current context and the additional contextual data. The search terms are used in view of the refined context to search the searchable information in the database for any relevant portions of data responsive to the query. One or more relevant portions of data responsive to the query are identified from the database. The one or more portions of data are returned to the other computing device in response to the query.

Embodiments of the present invention may comprise or utilize a special purpose or general-purpose computer including computer hardware, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
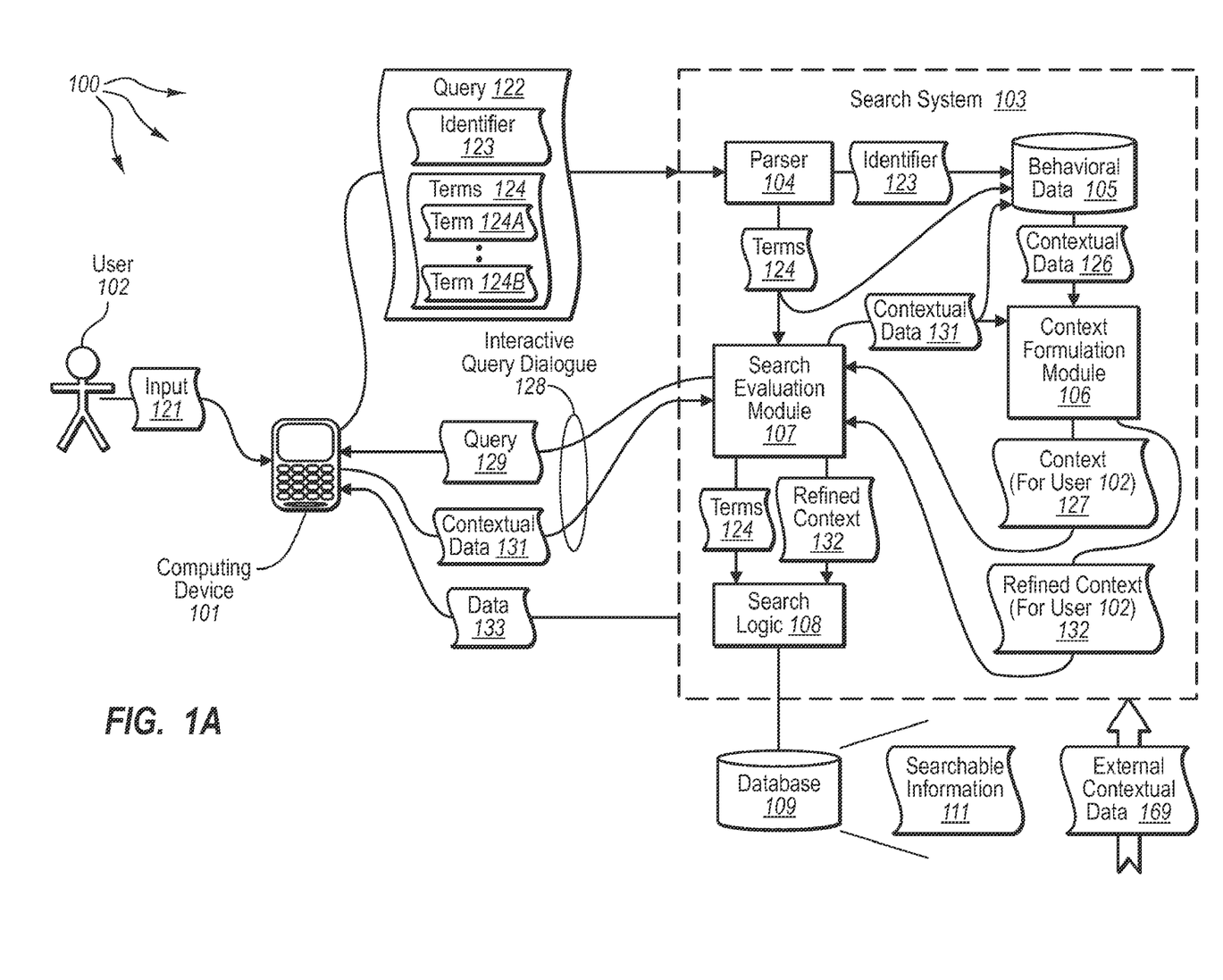
FIG. 1A illustrates an example computer architecture that facilitates iterative and interactive context based searching.

FIG. 1A illustrates an example computer architecture that facilitates iterative and interactive context based searching. Referring to FIG. 1A, computer architecture 100 includes computing device 102, search system 103, and database 109. Each of the depicted computer systems can be connected to one another over (or is part of) a network, such as, for example, a Local Area Network ("LAN"), a Wide Area Network ("WAN"), and even the Internet. Accordingly, each of the depicted computer systems, as well as any other connected computer systems and their components, can create message related data and exchange message related data over the network. The computer systems can exchange messages in accordance with any of a variety of protocols, services, and standards, such as, for example, Transmission Control Protocol ("TCP"), Hypertext Transfer Protocol ("HTTP"), Simple Mail Transfer Protocol ("SMTP"), Short Message Service ("SMS"), Multimedia Messaging Service ("MMS"), etc.

As depicted, search system 103 includes parser 104 behavioral data 105 context formulation module 106, search evaluation module 107, and search logic 108. Generally, parser 104 is configured to receive a query from another computer system (e.g., computing device 101) and parse the query. Parser 104 can parse a query to identify search terms, a user identifier (e.g., user 102), as well as location information associated with the other computer system (e.g., the current location of computing device 101). Parser 104 can use one or more of search terms, a user identifier, and location information to access relevant contextual data for a query. Parser 104 can also send search terms to search evaluation module 107.

Generally, behavioral information 105 can include behavioral information for a plurality of users. Behavioral data for a user can be indicative of one or more prior interactions a user has had with search system 103 (e.g., any users that have previously used search system 103 to search for information). In some embodiments, behavioral data is combined with other contextual data in a common database. A user's prior interactions with search system 103 can include past searches from a user, past locations the user located when searching, advertisements or offers a user has requested, etc.

Generally, context formulation module 106 is configured to receive contextual data, including at least accumulated behavioral data for an identified user, and formulate a query context. A formulated query context can be submitted to search evaluation module 107 to evaluate the sufficiency of a search based on the formulated query context. Context formulation module 106 is also configured to refine a query context when further contextual data related to a search is received.

Generally, search evaluation module 107 is configured to receive search terms and a query context and evaluate whether or not the search terms in view of the query context sufficiently define a user request for information. In some embodiments, search evaluation module 107 can determine that a query using particular search terms in view of a corresponding query context sufficiently defines a user request for information. For example, search evaluation module 107 can determine that a query using particular search terms in view of a corresponding context is likely to return an appropriate number of relevant results back to a user.

In other embodiments, search evaluation module 107 can determine that a query using particular search terms in view of a corresponding query context insufficiently defines a user request for information. For example, search evaluation module 107 can determine that a query using particular search terms in view of a corresponding query context is ambiguous, is unlikely to return any results, or is so broad that the query is likely to return an overly large amount of data. When search evaluation module 107 determines that a query insufficiently defines a user request, evaluation module 107 can initiate an interactive query dialogue with another computer system to obtain additional relevant context information. For example, search system 103 can initiate an interactive query dialogue with computing device 101.

An interactive query dialogue can include search evaluation module 107 sending a further query back to a computer system that sent the original query. The further query can be a request for additional relevant contextual data for a previously received query. For example, search evaluation module 107 can request the current state wherein computing device 101 is located. An interactive query dialog can also include search evaluation module receiving additional contextual data from the other computer system. For example, search evaluation module 107 can receive "Idaho" (entered by user 102) back from computing device 101.

An interactive query dialogue can include one or more exchanges wherein search system 103 submits a query and the other computing device returns additional context information in response to the query. For example, in response to receiving "Idaho" search system 103 can issue a further additional query to computing system 101 requesting the city where computing device 101 is located. In response, search system 103 can receive "Boise" (entered by user 102) back from computer device 101.

Alternately, search system 103 can issue a further query for zip code and receive back "83701"

When additional contextual data is received, search evaluation module 107 can store the contextual data in behavioral data 105 and/or can submit the additional contextual data back to context formulation module 106. Context formulation module 106 can use additional contextual data to refine an existing query context. When search evaluation module 107 determines that a query using particular search terms in view of a corresponding query context sufficiently defines a user request for information, search evaluation module 104 forwards the search terms and query context to search logic 108.

Generally, search logic 108 is configured to receive search terms and a corresponding query context and use the search terms in view of the query context to search for relevant portions of data. For example, search logic 108 can search database 109 for relevant portions of searchable information 111. From the search terms and query context, search logic can identify and return relevant portions of data back to requesting computer system (e.g., computing device 101).

Figure 2:
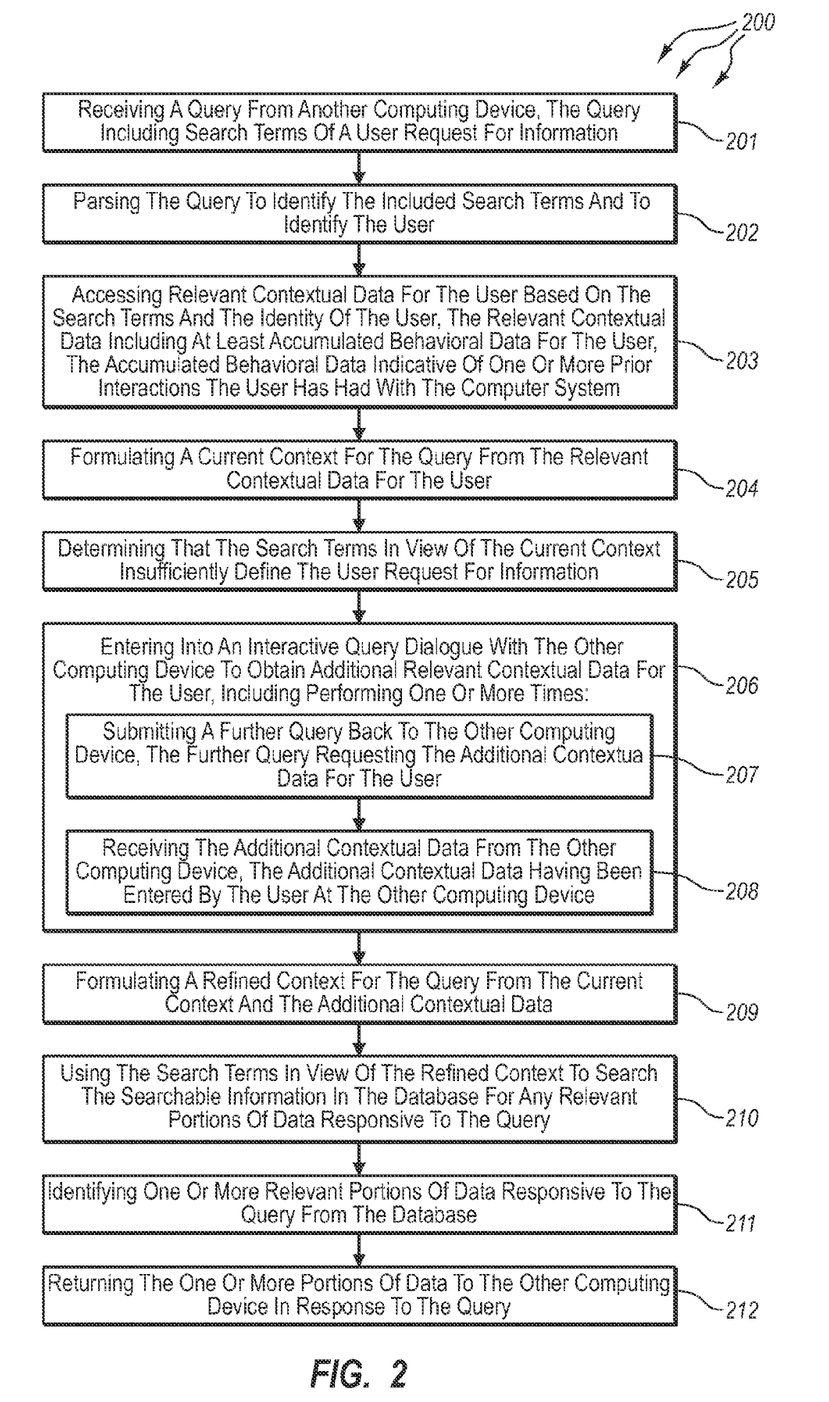
FIG. 2 illustrates a flow chart of an example method for providing a user with requested information.

FIG. 2 illustrates a flow chart of an example method 200 for providing a user with requested information. The method 200 will be described with respect to the components and data in FIG. 1A.

As depicted, in FIG. 1A, user 102 can enter input 121 into computing device 101. From input 121, computing device 101 can formulate query 122, for example, a request for relevant portions of data in database 109. Computing device 101 can send query 122 to search system 103. Query 122 includes identifier 123 and search terms 124. Identifier 123 can be an identifier, such as, for example, a telephone number or account number, that identifies computing device 101 and/or user 102. Search terms 124 can include one or more search terms (term 124A, term 124B, etc.) that define data of interest to user 102, such as, for example, a word, a phrase, a search string, a question, an advertisement code, etc. For example, search terms 124 can include a plurality of words forming a search string query, such as, for example, "Italian Food", "Laptop Computers", "Pizza Ogden, Utah". In some embodiments, query 122 is an SMS message sent to a short code (e.g., a 5 digit number) for search system 103. Various wired and/or wireless networks can be used to resolve the short code to search system 103. As part of SMS, the telephone number of computing device 101 can be appended to the SMS message.

Method 200 includes an act of receiving a query from another computing device, the query including search terms of a user request for information (act 201). For example, search system 103 can receive query 122 from computing device 101. Search system 103 interprets search terms 124 as a user request for information. For example, search system 103 can interpret the term "television" as a search for coupons and/or sales for televisions. In some embodiments, search system 103 receives an SMS message sent to its corresponding short code.

Method 200 includes an act of parsing the query to identify the included search terms and to identify the user (act 202). For example, parser 104 can parse query 122 to identify search terms 124 (e.g., television) and identifier 123. Method 200 includes an act of accessing relevant contextual data for the user based on the search terms and the identity of the user, the relevant contextual data including at least accumulated behavioral data for the user, the accumulated behavioral data indicative of one or more prior interactions the user has had with the computer system (act 203). For example, context formulation module 106 can access contextual data 126 from behavioral data 105. Contextual data 126 can include at least accumulated behavioral data for user 102 (e.g., from prior searches from user 102). Identifier 123 (e.g., a telephone number) can be used to identify contextual data 126. Contextual data 126 may also include behavioral data accumulated for other users that are similar to user 102. Similar users can be users that have had prior interactions with search system 103 that are similar to those of user 102 (e.g., previously queried for the same information, etc). In some other contextual data is also received from external data sources, such as, for example, weather services, flight information services, sports scores services, etc. For example, search system 103 can receive external contextual data 169 from other external data sources.

Method 200 includes an act of formulating a current context for the query from the relevant contextual data for the user (act 204). For example, context formulation module can formulate context 127 (for user 102) from contextual data 126. In some embodiments, external contextual data 169 is combined with contextual data 126 to formulate context 127. Method 200 includes an act of determining that the search terms in view of the current context insufficiently define the user request for information (act 205). For example, search evaluation module 107 can determine that search terms 104 in view of context 127 insufficiently define user 102's request for information. Search terms 124 in view of context 127 can be insufficient for any number of reasons, including ambiguity, likelihood of returning to few (or no) results, likelihood of returning to many results, etc.

Search evaluation module 107 can interoperate with search logic 108 to issue a query of database 109 with existing terms and context to determine how many results are to be returned. Search evaluation module 107 can then further interoperate with search logic 108 to determine if too few or too many results are returned.

Method 200 includes an act of entering into an interactive query dialogue with the other computing device to obtain additional relevant contextual data for the user (act 206). For example, search system 103 can enter into interactive query dialogue 128 with computer device 101 to obtain additional relevant contextual data for user 102.

The interactive query dialogue can include submitting a further query back to the other computing device, the further query requesting the additional contextual data for the user (act 207). For example, search evaluation module 107 can submit query 129 to computing device 101 to request additional contextual data for user 102 as part of interactive query dialogue 128. Search system 103 can utilize identifier 122 (e.g., a telephone number) to send query 129 back to computing device 129. In response to receiving query 129, computing device 101 can display the contents of query 129, prompting user 102 for additional contextual information. User 102 can enter additional contextual information (e.g., contextual data 131) in response to the prompt and send the additional information back to search system 103.

The interactive query dialogue can include receiving the additional contextual data from the other computing device, the additional contextual data having been entered by the user at the other computing device (act 208). For example, search evaluation module 127 can receive contextual data 131 from computing device 101 as part of interactive query dialogue 128. Contextual data 131 can be stored in behavioral data 105 for later use and/or submitted to context formulation module 106 for use in formulating a refine context for user 102.

Interactive query dialogue 128 can include one or more interactively exchanges (e.g., of SMS messages) wherein search system 103 submits a query and computing device 101 returns additional contextual data in response to the query. During each exchange, search system 103 can query for information that further refines the information obtained from one or more prior queries of interactive query dialogue 128. For example, if query 122 included the term "television", query 129 may request "LCD or Plasma". In response, contextual data 131 can include "LCD". A further query of interactive dialogue 128 can include "1. 30-36 inches, 2. 38-42 inches, 3. 44-50 inches, or 4. 52+ inches". In response, further contextual data can indicate that user 102 is interested in a television that is between 44 and 50 inches (selection 3). As such, further contextual data for a user can be interactively and iteratively obtained in response to receiving an initial query (e.g., query 122).

Method 200 includes an act of formulating a refined context for the query from the current context and the additional contextual data (act 209). For example, context formulation module 106 can formulate refined context 132 from context 127 and contextual data 131. In some embodiments, context formulation module 106 formulates a refined context as each new portion of contextual data is received from an interactive exchange. In other embodiments, context formulation module 106 waits until interactive query dialogue 128 is completed and formulates a refined context based on contextual data obtained from the one or more (or a plurality of) interactive exchanges.

Search evaluation module 107 can re-evaluate search terms in view of each refined context. When search evaluation module 107, determines that a search in view of a refined context is sufficient, it can submit the search terms and the refined context to search logic 108. For example, search evaluation module 107 can determine that terms 124 in view of refined context 132 sufficiently defines user 102's request. That is, search evaluation module 107 can determine that a search of database 109 based on terms 124 in view of refined context 132 is likely to provide an appropriate number of relevant results for query 122. For example, search evaluation module 107 (potentially through interoperation with search logic 108) can determine that between 3-6 results of offers for sale or coupons associated with LCD televisions between 44 and 50 inches are likely to be returned.

Method 200 includes an act of using the search terms in view of the refined context to search the searchable information in the database for any relevant portions of data responsive to the query (act 210). For example, search evaluation module 107 can submit terms 124 and refined context 132 to search logic 108. Search logic 108 can in turn utilize terms 124 in view of refined context 132 to search searchable information 111 for information responsive to query 122. Searchable information 111 can include any type of information, including but not limited to community information, school information (e.g., including calendars, teacher hours, dialing announcements), merchant related information, etc. In some embodiments, searchable information 111 includes merchant related information, such as, for example, business addresses, business hours, scheduled events, advertisements, offers, promotions, coupons, etc., being provided by various merchants.

Method 200 includes an act of identifying one or more relevant portions of data responsive to the query from the database (act 211). For example, search logic 108 can identify data 123 (e.g., an indication of one or more offers, scheduled events, promotions, or coupons) as responsive to query 122. Data 123 can include an appropriate number of relevant results for query 122 returned from searchable data 111. For example, data 123 can include 3-6 results of offers for sale or coupons associated with LCD televisions between 44 and 50 inches are likely to be returned.

Method 200 includes an act of returning the one or more portions of data to the other computing device in response to the query (act 212). For example, search system 103 can return data 123 (e.g., in an SMS message) to computing device 101. Computing device 101 can display data 123 to user 102. If user 102 is interested in a specific offer, they can select the offer to obtain further information and/or a coupon code associated with the offer. Thus, returned merchant related information can include an identifier, such as, for example, a number, that indentifies the merchant related information when presented back to a merchant. For example, a returned coupon can include a number that indicates to a merchant that it is their coupon and that the coupon corresponds to a discount to one of their products.

Figure 1B:
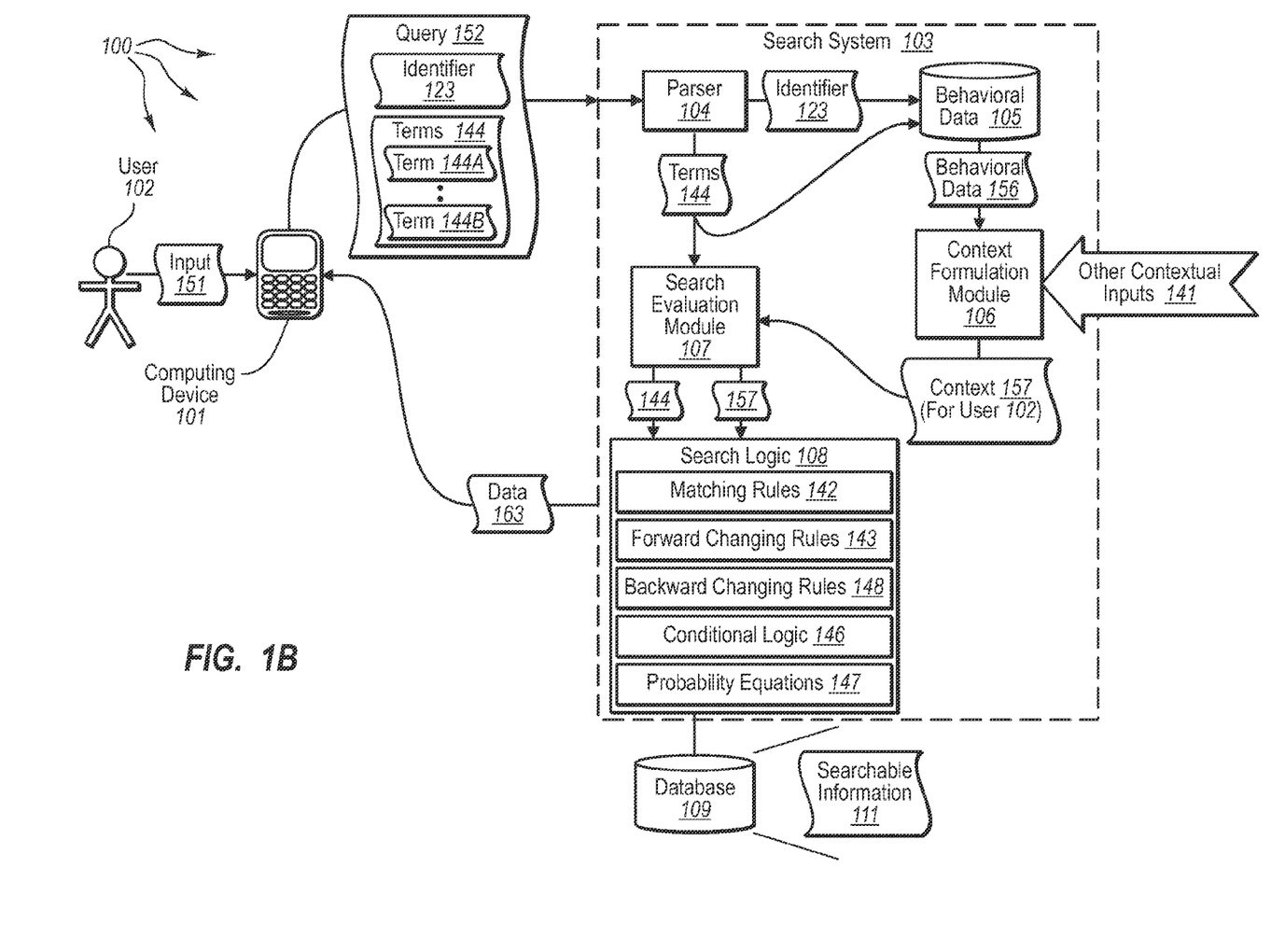
FIG. 1B illustrates another view of the example computer architecture that facilitates iterative and interactive context based searching.

FIG. 1B illustrates another view of computer architecture 100 that facilitates iterative and interactive context based searching. Generally, search logic 108 can include one or sub-modules implementing portions of search logic. The sub-modules can interoperate to determine if a portion of searchable data matches specified search term in view of a context. In some embodiments, search logic 108 includes an expert system (a system using artificial intelligence, such as, for example an inference engine) that uses rules processing to identify matches between portions of searchable data and a specified search term in view of specified context. For example, as depicted in FIG. 1, search logic 108 includes sub-modules for matching rules 142, forward chaining rules 143, backward chaining rules 148, conditional logic 146, and probability equations 147. Rules corresponding to each of these sub-modules can interoperate to determine when a portion of search data 111 matches specified search terms (e.g., from user 102) in view of a specified context (e.g., applicable for user 102). Forward chaining rules 143 and backward chaining rules 148 can utilize inference rules.

In some embodiments, context formulation module 106 can receives other contextual information in addition to behavioral data for a user. For example, as depicted in FIG. 1B, context formulation module 106 also receives other contextual inputs 141. Other contextual inputs 141 can include, for example, attributes derived from surveys, environmental information (e.g., weather, time of day, etc.), other historical patterns, flight information (e.g., flight numbers, arrival times, departure times, etc.), sports information (e.g., scores, spreads, start times, etc.), other event-related information, etc.

As such, user 102 can enter input 151 into computing device 101. From input 151, computing device can formulate query 152. Query 152 can include identifier 123 and terms 144. Computing device 101 can send query 152 to search system 103. For example, query 152 can be an SMS message sent to the short code for search system 103. Search system 103 can receive query 152 from computing device 101.

Parser 104 can then parse identifier 123 and terms 154 from query 153. Identifier 123 can be used to identify behavior data 156 (potentially now including behavioral data that was accumulated during processing of query 122) for user 102. Context formulation module 106 can use behavioral data 156 along with other contextual inputs 141 to formulate context 157 (for user 102). For example, context formulation module 106 can use the time of day to formulate a context that limits search results to stores that are currently open. Search evaluation module can determine that a search based on terms 144 in view of context 157 is likely to provide an appropriate number of relevant results for return to computing device 101.

Search logic 108 can use terms 144 in view of context 157 to search searchable information 111. The sub-modules in search logic 108 can interoperate identify portions of search information 111 that match terms 144 in view of context 157. For example, matching rules 142, forward chaining rules 143, backward chaining rules 148, conditional logic 146, and probability equations 147 can interoperate to match data 163 to terms 144 in view of context 157. Search system 103 can return data 163 to computing device 101. Data 163 can be an SMS message send to identifier 123 (the telephone number of computing device 101).

Figure 1C:
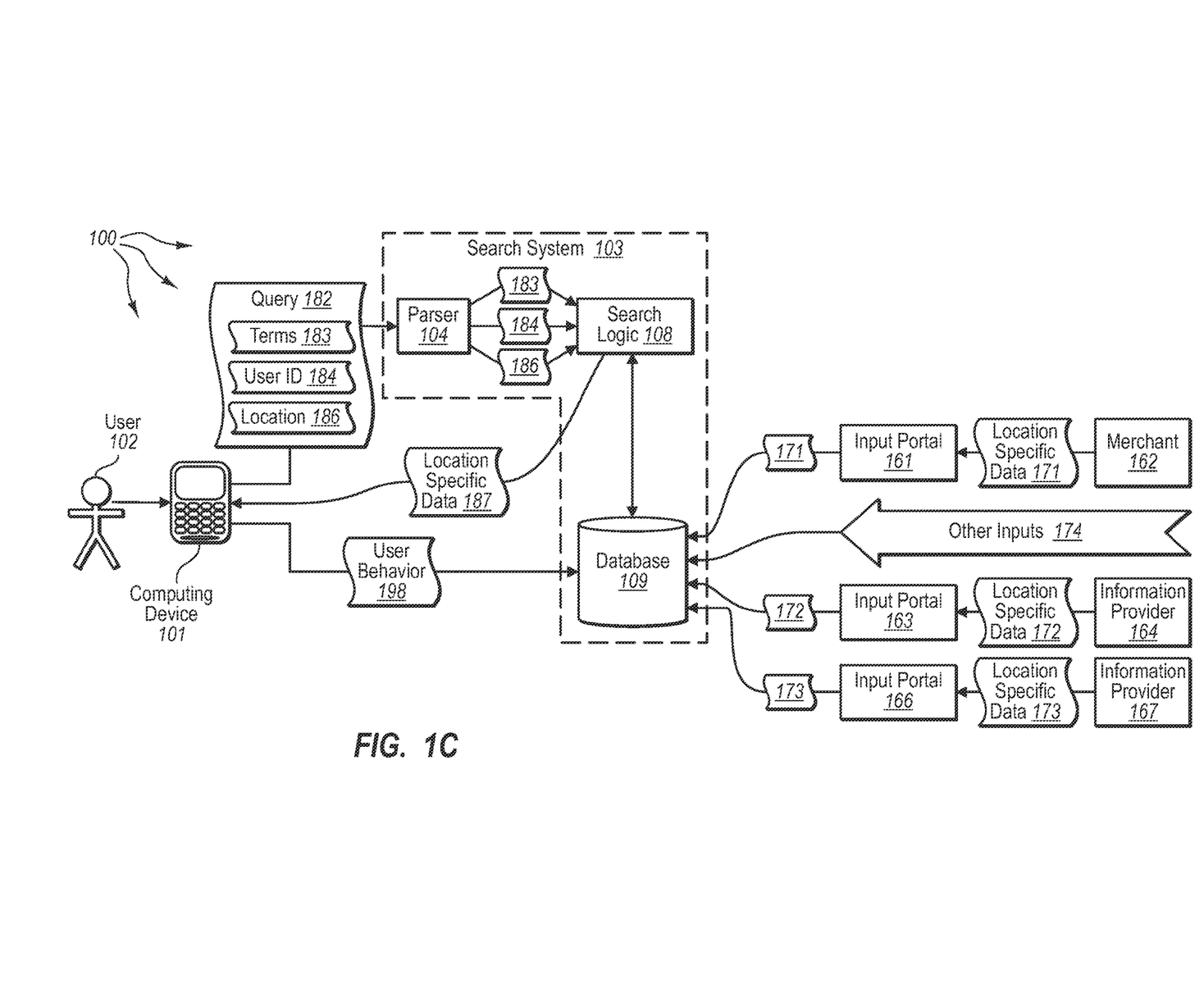
FIG. 1C illustrates a further view of the example computer architecture that facilitates iterative and interactive context based searching.

FIG. 1C illustrates a further view of computer architecture 100 that facilitates iterative and interactive context based searching. In some embodiments, behavioral data, other context information, as well as searchable information are all stored in a common database. For example, as depicted in FIG. 1C, database 109 is utilized to store behavioral data, merchant data, information provide data, and other inputs. Each merchant and information provider can have a specified (and potentially private) input portal that is used to enter information into database 109.

For example, merchant 162, information provider 164, and information provider 167 can utilize corresponding input portals 161, 163, and 166 respectively to enter searchable information into database 109. Merchants can contract with the owner or operator of search system 103 through a subscription service or similar agreement. As part of the agreement, the owner or operator of search system 103 provides the merchant with a unique code to address database 109 through a corresponding input portal. Merchants and/or information providers can enter of a variety of different types of searchable information into database 109, such as, for example, offers, scheduled events, promotions, coupons, etc.

Entered information can be location-specific information. For example, a merchant can define an offer, scheduled event, promotion, coupon, etc., as being valid in a specified geographical area. A merchant can define a specified geographical area by zip code, by city, county, or state boundary, etc. Thus, a merchant can identify the geographic extent of the intended audience of users to which a offer, scheduled event, promotion, coupon, etc., is directed. By defining a geographic area, a merchant may issue a coupon or promotion that is redeemable at or send invitations to an event for users within a specified radius of specified locations.

For example, a merchant having a single business location can input a coupon that is to be accessible to user located within a specified geographic area, such as, for example, the area or zip code or zip codes in the vicinity of the single business location. Similar location-specific information can be entered by a merchant (e.g., a regional or national merchant) that has a plurality of business locations. In these embodiments, location-specific information can include specific business locations participating in a promotion or scheduled event or that are accepting a coupon. Accordingly, a user (e.g., user 102) can be provided with location-specific results, such as, for example, the nearest participating business location for a merchant. Merchants with multiple business locations can also tailor offers, promotions, scheduled events, coupons, etc. to specified business locations (e.g., by region, etc.)

Entered information can also have time constraints that limit the amount of time an offer, promotion, coupon, etc., are valid.

Thus, merchant 162 can enter location-specific data 171, information provider 164 can enter location-specific data 172, information provider 167 can enter location specific data 173, etc. Other inputs 174 can include other contextual data, such as, for example, weather, time, etc.

As such, it may be that user 102 issues query 182 to search system 103. Query 182 can include terms 183, user id 184, and location 186. User id 184 can be a user id from a previous registration process with search system 103, the telephone number of computing device 101, etc. Location 186 can be a zip code entered at computing device, Global Positioning System ("GPS") coordinates, or any other mechanisms for determining the location of computing device 101. Parser 104 can receive query 182 and parse out terms 183, user ID 184, and location 186.

Search logic 108 (including any interoperating sub-modules) can utilize terms 183, user ID 184, and location 186 as well as any behavioral and other contextual information associated with user 102 to search database 109. Search logic 108 can search database 109 for offers, events, promotions, coupons, etc, that match terms 183 in view of a formulated context. The formulated context can include location 186 such that identified matches are limited to offers, events, promotions, coupons, etc, within an appropriate distance of location 186. For example, search logic 108 can identify location-specific data 187 and return location-specific data 187 to computing device 101. Behavioral data collected for user 102, for example, as the result of an interactive query dialogue, can be stored in database 109 for use in formulating subsequent contexts for user 102. For example, user behavior 198 related to query 182 can be stored in database 109.

Figure 1D:
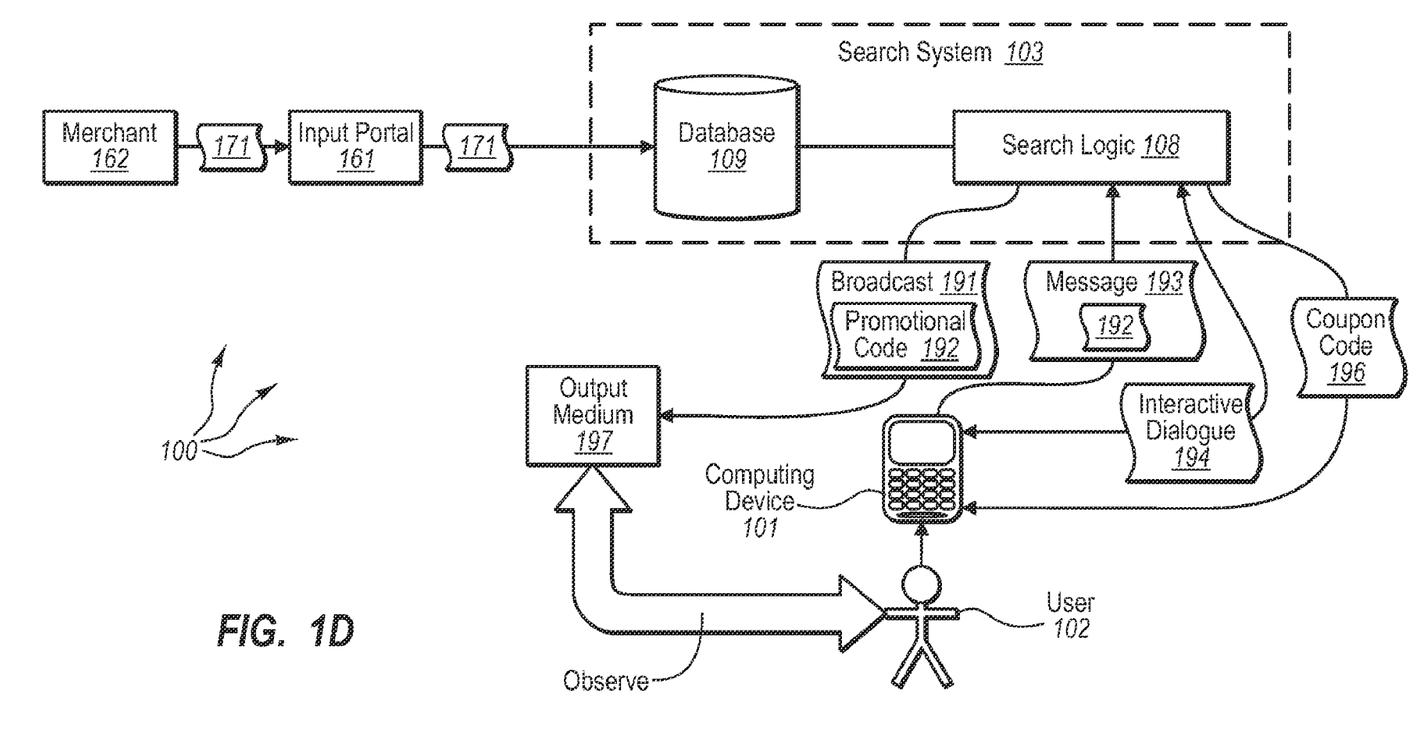
FIG. 1D illustrates an additional view of the example computer architecture that facilitates iterative and interactive context based searching.

FIG. 1D illustrates an additional view of computer architecture 100 that facilitates iterative and interactive context based searching. In some embodiments, search system 103 broadcasts searchable information, such as, for example, promotions, events, offers, coupons, etc., to users. As depicted in FIG. 2D, merchant 162 accesses database 109 through input portal 161. Merchant 162 can enter location-specific coupon 171 into database 109 through input portal 161.

After location-specific coupon 171 is entered, an advertisement for location-specific coupon 171 can be presented on/at output medium 197. Output medium 197 can be any medium, such as, for example, a billboard, Television, Radio, at a sporting event, in a theater, on a paper handout, etc. In the advertisement, a promotional message can be conveyed along with a code corresponding to location-specific coupon 171. For example, broadcast 191 can be presented at output medium 197. Broadcast 191 includes promotional code 192.

Subsequently, user 102 can observe broadcast 191 and may desire to take advantage of location-specific coupon 171. Accordingly, user 102 sends message 192 (e.g., an SMS message), including promotional code 192, to search system 103. Search logic 108 can then use the promotional code, as well as any contextual information (e.g., location information) known about user 102, to locate location-specific coupon 171. If search system 103 is unaware of the location of or other contextual data for user 102, search system can initiate interactive dialogue 194 to obtain further contextual data for user 102. If the user is within the corresponding defined geographically area, search system 1 03 delivers coupon code 1 94 to computing device 101. Coupon code 196 can be a code known to merchant 162 to correspond to location-specific coupon 171. Accordingly, user 103 can show coupon code 199 (e.g., on the display of computer device 101) to merchant 162 to take advantage of location-specific coupon 171.

In some embodiments, search system 103 implements a Predictive Behavior Context Search. Upon receiving search terms and formulating a context, one or more sub-modules of search logic 108 (e.g., conditional logic 146 and probability equations 147) can interoperate to attempt to predict a user's future behavior. In these embodiments, search system 103 accepts a search string and returns results with a higher probability of relevancy to a user's future behavior. For example, search system 103 can provide search results based on a prediction of a user's future behavior, such as, for example, the user's future buying behavior. Thus, if search system 103 receives search terms for "Mexican food" from a user, search system 103 can assume, at least to some extent, that the user is likely to buy Mexican food in the near future. As such, search system 103 can return search results that have a higher probability of relevancy to the purchase of Mexican food.

In some embodiments, a user uses a mobile computing device, such as, for example, a mobile telephone, to initiate a user query by sending an SMS message to the short code (or other telephone number) for search system 103. Search system 103 uses a variety of contextual information, including one or more of past searches for the user, past locations of the user, advertisements or offers request for the user, attributes captured from surveys for the user, purchase patterns of the user, purchase patterns of other users, and environmental data, to formulate a context for the user. When appropriate, search system 103 initiates an interactive query dialogue with the mobile computing device to obtain further user context. The interactive query dialogue can include an exchange of a plurality of SMS messages between the mobile computing device and search system 103. Subsequently, based on search terms and a formulated context, search system 103 searches for searchable information relevant to the user query. Search system 103 then returns an appropriate number of relevant search results back to the mobile computing device in an SMS message.

Accordingly, embodiments of the invention can be used to iteratively and interactively search for information. A search system can guide a user to enter contextual information that assists in refining a search so that an appropriate number of relevant results are returned. Thus embodiments of the invention can provide a user with relevant location-specific information in response to a query from the user. Provided information can also be relevant to a user's predicted future behavior. As context for a user is obtained and/or accumulated, such as, for example, through an interactive query dialogue, the probability of providing relevant information in response to a query from the user increases.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system including a database of searchable information, a method for providing a user with requested information, the method comprising:
   an act of using input portals to enter searchable information into a database, the searchable information comprising contextual data, location specific information, and time specific information;
   an act of receiving a query from another computing device, the query including search terms of a user request for the searchable information;
   an act of parsing the query to identify the included search terms and to identify the user;
   an act of accessing relevant contextual data for the user based on the search terms and the identity of the user, the relevant contextual data including at least accumulated behavioral data for the user, the accumulated behavioral data indicative of one or more prior interactions the user has had with the computer system, the contextual data also including the user's search history;
   an act of formulating a current context for the query from the relevant contextual data for the user;
   an act of determining that the search terms in view of the current context do not define the user request for information since the search terms in view of the current context are ambiguous, provide too few relevant results, or provide too many relevant results;
   an act of entering into an interactive query dialogue with the other computing device to obtain additional relevant contextual data for the user, including performing one or more times:
      an act of submitting a further query back to the other computing device, the further query requesting the additional contextual data for the user; and
      an act of receiving the additional contextual data from the other computing device, the additional contextual data having been entered by the user at the other computing device;
   the computer system formulating a refined context for the query from the current context and the additional contextual data;
   an act of using the search terms in view of the refined context to search the searchable information in the database for any relevant portions of data responsive to the query;
   an act of identifying one or more relevant portions of data responsive to the query from the database; and
   an act of returning the one or more portions of data comprising the user's search history to the other computing device in response to the query.

2. The method as recited in claim 1, further comprising prior to receiving the query from the other computer system an act of accumulating relevant contextual data for the user from one or more of: past searches from the user, past locations of the user, and past purchases of the user.

3. The method as recited in claim 1, wherein the act of accessing relevant contextual data comprises an act of accessing environmental data corresponding to the location of user.

4. The method as recited in claim 1, wherein the act of accessing relevant contextual data comprises an act of accessing external contextual data from one or more external data sources.

5. The method as recited in claim 4, wherein the act of accessing external contextual data from one or more external data sources comprises an act of accessing external data form one or more of a weather service, a flight information service, and a sports score service.

6. The method as recited in claim 1, wherein the act of entering into an interactive query dialogue with the other computing device comprises an act of exchanging a plurality of SMS (Short Message Service) messages with the other computing device.

7. The method as recited in claim 1, wherein the act of using the search terms in view of the refined context to search the searchable information in the database comprises an act of using the search terms in view of the refined context to search for location-specific merchant related information, the location-specific merchant related information entered into the database by one or more merchants to target the merchant related information to specified geographic areas, the location-specific merchant related information including one or more of offers, events, promotions, and coupons.

8. The method as recited in claim 7, wherein the act of portions of search logic, including one or more of: matching rules, forward chaining rules, backward chaining rules, conditional logic, and probability equations, interoperating to identifying one or more relevant portions of data based on the search terms in view of the refined context comprises an act of identifying location-specific information based on an identified location of the user.

9. The method as recited in claim 8, wherein the act of identifying location-specific information based on an identified location of the user comprises an act of identifying location-specific data having a higher probability of relevancy to the user's future behavior than at least one other portion of data in the database.

10. The method as recited in claim 1, wherein the act of using the search terms in view of the refined context comprises an act of attempting to predict the future behavior of the user; and
   wherein the act of identifying one or more relevant portions of data responsive to the query from the database comprises an act of identifying portions of data with a higher probability of relevancy to the user's future behavior than at least one other portion of data in the database.

11. The method as recited in claim 1, wherein the act of identifying one or more relevant portions of data responsive to the query from the database comprises an act of portions of search logic, including one or more of: matching rules, forward chaining rules, backward chaining rules, conditional logic, and probability equations, interoperating to identifying one or more relevant portions of data based on the search terms in view of the refined context.

12. The method as recited in claim 1, wherein the act of receiving a query from another computing device comprises an act of receiving an SMS (Short Message Service) message sent to a short code corresponding to a search system at the computer system.

13. A computer program product for use at a computer system, the computer system including a database of searchable information, the computer program product for implementing a method for providing a user with requested information, the computer-program product comprising one or more processors and one or more computer storage media having stored thereon computer-executable instructions that, when executed at the one or more processors, cause the computer system to perform the method, including the following:

using input portals to enter searchable information into a database, the searchable information comprising contextual data, location specific information, and time specific information;

receive a query from another computing device, the query including search terms of a user request for the searchable information;

parse the query to identify the included search terms and to identify the user;

access relevant contextual data for the user based on the search terms and the identity of the user, the relevant contextual data including at least accumulated behavioral data for the user, the accumulated behavioral data indicative of one or more prior interactions the user has had with the computer system, the contextual data also including the user's search history;

formulate a current context for the query from the relevant contextual data for the user;

determine that the search terms in view of the current context insufficiently do not define the user request for information since the search terms in view of the current context are ambiguous, provide too few relevant results, or provide too many relevant results;

enter into an interactive query dialogue with the other computing device to obtain additional relevant contextual data for the user, including performing one or more times:

submitting a further query back to the other computing device, the further query requesting the additional contextual data for the user; and     receiving the additional contextual data from the other computing device, the additional contextual data having been entered by the user at the other computing device;

the computer system formulating a refined context for the query from the current context and the additional contextual data;

use the search terms in view of the refined context to search the searchable information m the database for any relevant portions of data responsive to the query;

identify one or more relevant portions of data responsive to the query from the database; and     returning the one or more portions of data comprising the user's search history to the other computing device in response to the query.

14. The computer program product as recited in claim 13, further comprising computer-executable instructions that, when executed, cause the computer system to accumulate relevant contextual data for the user from one or more of: past searches from the user, past locations of the user, and past purchases of the user prior to receiving the query from the other computer system.

15. The computer program product as recited in claim 13, wherein computer-executable instructions that, when executed, cause the computer system to use the search terms in view of the refined context to search the searchable information in the database comprise computer-executable instructions that, when executed, cause the computer system to use the search terms in view of the refined context to search for location-specific merchant related information, the location-specific merchant related information entered into the database by one or more merchants to target the merchant related information to specified geographic areas, the location-specific merchant related information including one or more of offers, events, promotions, and coupons.

16. The computer program product as recited in claim 13, wherein computer-executable instructions that, when executed, cause the computer system to use the search terms in view of the refined context comprise computer-executable instructions that, when executed, cause the computer system to attempt to predict the future behavior of the user; and     wherein computer-executable instructions that, when executed, cause the computer system to identify one or more relevant portions of data responsive to the query from the database comprise computer-executable instructions that, when executed, cause the computer system to identify portions of data with a higher probability of relevancy to the user's future behavior than at least one other portion of data in the database.

17. The computer program product as recited in claim 13, wherein computer-executable instructions that, when executed, cause the computer system to identify one or more relevant portions of data responsive to the query from the database comprise computer-executable instructions that, when executed, cause one or more of: matching rules, forward chaining rules, backward chaining rules, conditional logic, and probability equations, to interoperate to identify one or more relevant portions of data based on the search terms in view of the refined context.

18. The computer program product as recited in claim 17, wherein computer-executable instructions that, when executed, cause one or more of: matching rules, forward chaining rules, backward chaining rules, conditional logic, and probability equations, to interoperate to identify one or more relevant portions of data based on the search terms in view of the refined context comprise computer-executable instructions that, when executed, cause the computer system to identify location-specific information based on an identified location of the user.

19. The computer program product as recited in claim 18, wherein computer-executable instructions that, when executed, cause the computer system to identify location-specific information based on an identified location of the user comprise computer-executable instructions that, when executed, cause the computer system to identify location-specific data having a higher probability of relevancy to the user's future behavior than at least one other portion of data in the database.

20. A search system, the search system comprising:

system memory;

one or more processors; and one or more computer storage media having stored there on computer-executable instructions representing a parser, a context formulation module, a search evaluation module, and search logic, the parser configured to:

use input portals to enter searchable information into a database, the searchable information comprising contextual data, location specific information, and time specific information     receive a query from another computing device, the query including search terms of a user request for the searchable information; and     parse the query to identify the included search terms and to identify the user;

wherein the context formulation module is configured to:

access relevant contextual data for the user based on the search terms and the identity of the user, the relevant contextual data including past searches of the user, past user locations for the user, past purchases of the user, attributes captured from surveys taken by the user, and environmental data based on the users location, the contextual data also including the user's search history; and formulate a context for a received query from the relevant contextual data for the user;

wherein the query evaluation module is configured to:

determine whether the search terms in view of the current context sufficiently define the user request for information by not being ambiguous or by returning an adequate number of results; and when the search terms in view of the context insufficiently define the user request for information enter into an interactive query dialogue with the other computing device to obtain additional relevant contextual data for the user, including performing one or more times:

submitting an SMS (Short Message Service) message including a further query back to the other computing device, the further query requesting the additional contextual data for the user; and receiving an SMS message including the additional contextual data from the other computing device, the additional contextual data having been entered by the user at the other computing device;

wherein the search logic includes one or more portions of search logic including: matching rules, forward chaining rules, backward chaining rules, conditional logic, and probability equations, and wherein the portions of search logic interoperate to:

use search terms in view of a context to search the searchable information in the database for any relevant portions of data responsive to the query;

identify one or more relevant portions of data responsive to the query from the database; and return the one or more portions of data comprising the user's search history to the other computing device in response to the query.

21. The search system as recited in claim 20, wherein use search terms in view of a context to search the searchable information in the database comprises using search terms in view of a context to search for location-specific merchant related data having a higher probability of relevancy to the user's future behavior than at least one other portion of data in the database, the location-specific merchant related data including one or more of: an offer, a promotion, and a coupon from a merchant.

* * * * *